United States Patent [19]

Eliachar et al.

[11] Patent Number: 5,301,459

[45] Date of Patent: Apr. 12, 1994

[54] TREE CLIMBING DEVICE

[75] Inventors: Eliahu Eliachar, Haifa; Eliahu Mizrachi, Petach Tikva, both of Israel

[73] Assignee: Toptech Ltd., Haifa, Israel

[21] Appl. No.: 886,290

[22] Filed: May 21, 1992

[30] Foreign Application Priority Data

Jun. 2, 1991 [IL] Israel ........................................ 98335

[51] Int. Cl.$^5$ .......................... A01D 46/00; A01G 3/08
[52] U.S. Cl. ........................................... 47/1.01; 47/58; 144/208 K
[58] Field of Search ............................. 47/1.01, 58.01; 144/208 K

[56] References Cited

U.S. PATENT DOCUMENTS

| 2,477,922 | 8/1949 | Emery | 47/1 B |
| 2,534,595 | 12/1950 | Hamilton | 47/1 B |
| 2,541,767 | 2/1951 | Jones | 47/1 B |
| 2,612,724 | 10/1952 | Llewellyn | 47/1 B |
| 4,735,244 | 4/1988 | Kacer | 47/1 B |
| 5,056,258 | 10/1991 | Quinn | 47/1 B |

Primary Examiner—Henry E. Raduazo
Attorney, Agent, or Firm—Lowe, Price, LeBlanc & Becker

[57] ABSTRACT

The present invention relates to a device for climbing up trees and for maintenance of trees having trunks which do not branch out but rather have a single stem, such as palm trees or coconut trees.

17 Claims, 7 Drawing Sheets

TREE CLIMBING DEVICE

BACKGROUND TO THE INVENTION

The technology available for climbing up trees for purposes of their maintenance consists of lifting a worker to tho working site. For this purpose hydraulic devices are used. The devices vary in their capacity to lift the worker to varying heights and ground structure transferability. The price of these devices varies according to their capabilities and safety characteristics. The higher a device can lift, the higher its price will be.

In the palm tree plantation today many kinds of man lifting devices are used to do the work at the tree top. These devices are the same as those used in such sites as construction sites, electric company working sites, local municipality sites and others.

The devices operating today in palm tree plantations include: EFRON—a small device for lifting a person to various heights up to 15 meters, MANITO—a medium size device for lifting a person to heights up to 15 meters, MARK LIFT—large devices for sites up to 20 meters high. The two last devices mentioned are very expensive and their operation is very slow. The slow work pace is one of the problems that the palm tree growers have to deal with. In working on plantations there are quite a few tasks that have to be done quickly or else insufficient amounts of fruit will be gathered. The devices common today are slow and are too expensive to make it possible to purchase several devices. Most palm tree growers cannot afford to buy the expensive devices, so when a tree reaches the height of the maximum capability of the device that they can afford, the tree is cut down and replaced by a new young tree that will yield its first fruit only seven years later. The amount of fruit yielded by palm trees is in close correlation with their heights. Thus just when the tree is cut down it has the potential for yielding its best crop. The risk of lifting a person to this height is very great and so the lifting devices get to be large and expensive and the growers cannot afford them. Another problem of the large devices in the plantation is their weight which does considerable damage to the ground—packing the ground, a problem from which agriculture suffers a great deal.

The present invention relates to a device that may replace the common technology used today especially for palm plantations and the like and which is based on a new conception of the task at hand—control from the ground by remote control. The device can rise to any desired height without risk to a person or damage to the ground. The price of the proposed device can be low enough for the growers to afford, and thus they will be able to buy several devices at a much lower price than that of one of the common devices used today. The device according to the present invention will be able to do the work faster, cheaper and much more safely for a much lower price.

SUMMARY OF THE INVENTION

The present invention relates to a device for climbing up trees and for their maintenance of trees having trunks which do not branch out but rather have a single stem. The device comprises:

A power source which enables the device to function;

A climbing unit operatively connected to said power source and to a programmable controller (PLC) wherein said climbing unit comprises two pairs of arms and means for opening and closing said arms around the trunk and means for varying the distance between the two pairs of arms;

A programmable controller (PLC) which translates the commands given through a control box manually operated by the operator on the ground, to the climbing unit and to the work production unit; and A work production unit operatively connected to the programmable controller positioned on the climbing unit comprising a circular base and means for maintenance of said trees.

The present invention relates to a device for ascending and maintaining trees having trunks which do not branch out but rather have a single stem such as palm trees or coconut trees. Said device is comprised of a power source, a climbing unit, a programmable controller and a work production unit.

The preferred power source is an hydraulic source located beneath the climbing unit and attached to it. The power source enables the device to function.

The climbing unit is operatively connected to the power source and a programmable controller (PLC) wherein said climbing unit comprises two pairs of arms and means for opening and closing said arms around the trunk and means for varying the distance between the two pairs of arms. The means for opening and closing said arms and for varying the distance between the two pairs of arms are preferably three or four cylinders operatively connected to the hydraulic power source wherein one cylinder serves for opening and closing each pair of arms and one or two cylinders serve for varying the distance between the two pairs of arms.

The programmable controller (PLC) translates the commands to the climbing unit and to the production unit given through a control box manually operated by the operator on the ground.

The ascent or descent of the device on the trunk is brought about by locking the first pair of arms in the climbing unit around the trunk and distancing the second pair of arms and their consecutively locking said second pair and unlocking the first pair and distancing it.

For safety purposes the two pairs of arms in the climbing unit can be simultaneously opened only by pressing a special button on the device itself and not by any button in the control box in the operator's hand. Furthermore, for safety purposes the two pairs of arms are closed simultaneously around the stem by the force exerted by springs in the case of any engine failure.

The work production unit is operatively connected to the programmable controller positioned on the climbing unit, and comprises a circular base and means for maintenance of said trees. Said circular base is comprised of a circular track with an "I" profile that opens around an axis and which has a toothed band on it. The means for maintenance of the trees located in the work production unit are comprised of:

a multi functional cart attached to the track using an engine preferably an hydraulic engine to move around the trunk as desired by the operator wherein said cart's engine has a gear that fits in the toothed band and wherein the cart is supported by four wheels, two from each side of the track;

and a harvesting unit or pruning unit or fertilizing unit or fruit supporting unit or any other unit for caring for trees wherein said unit is located on the multi functional cart.

The pruning unit is preferably comprised of a rotating disk connected to an hydraulic engine.

The fertilizing unit is preferably comprised of a powdering element with a hydraulic fan creating a flow of air through a Venturi pipe combining air and powder flow.

The fruit supporting unit is preferably comprised of a ring which support the entire tree top, branches and fruit.

The harvesting unit is preferably comprised of a round platform holding the bunch of fruit that is cut down.

Before going out to the plantation there are a few preparations to be made according to the function that the device is expected to perform (can be done in the field), for example installing the fertilizing unit or the harvesting platform. The device is transported to the field on a transport vehicle. At the field the device can be moved manually or by using a cart or supporting wheels.

Standing close to the stem while the device is climbing is forbidden by all means. A falling branch may cause severe injury especially a palm branch with its thorns. While the device is at work a distance should be kept from the stem also because a technical failure may occur. The device is planned to deal with technical problems in order to avoid accidents as much as possible.

An engine failure when the device is at work can happen. In this case no matter where the device is at this moment the two pairs of arms should close immediately around the stem to avoid an accident. The two pairs of arms are "normally closed" this is done by spring force, in order to open the arms hydraulic pressure is needed. An alarm system may also be connected to the device to notify the operator of fuel shortage.

The climbing sequence is controlled by the programmable controller, to avoid a step being taken before its time which may cause an accident. There is a feedback unit to make sure that this will not happen.

The command to open both pairs of arms simultaneously cannot be given through the control box to avoid a situation in which the arms will open above the ground.

This command is only given in order to put the device around the stem or to take the device off the stem. The switch that gives the system the order to do this function is on the device itself which means that in order to use this switch the device has to be on the ground.

The device according to the preferred embodiment of the invention will be illustrated and clarified by the following figures. These figures are in no way meant to limit the scope of the present invention but serve only for clarification and illustration.

DETAILED DESCRIPTION OF THE FIGURES

Figure 1:
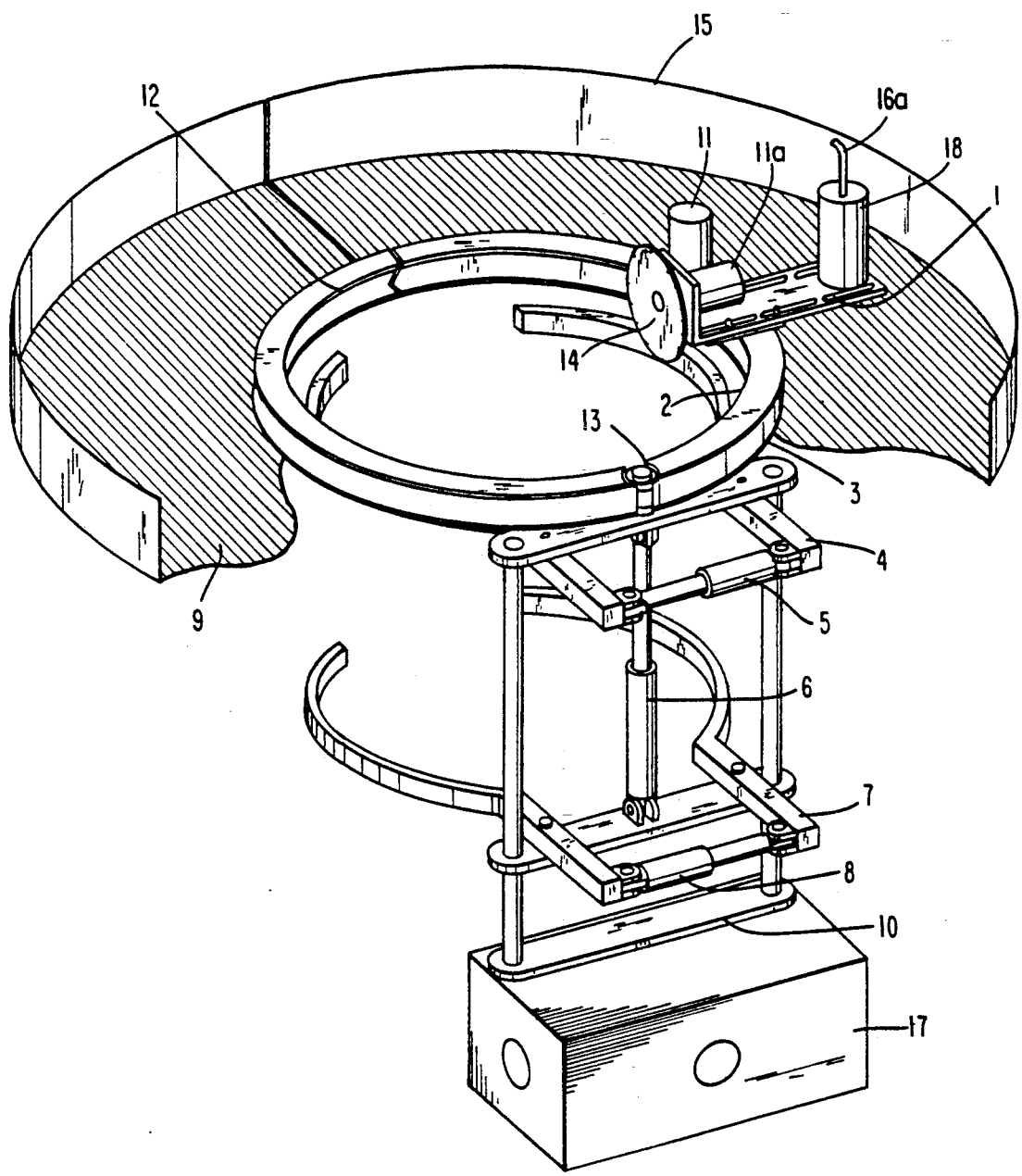
FIG. 1 represents a perspective view of the device.

FIG. 1 illustrates a perspective view of the device. Said device is brought to the stem. Then in order to open the two pairs of arms (4) and (7) simultaneously, the hydraulic engine (17) must be turned on in order to supply hydraulic pressure to the cylinders (5) and (8). The command to open the two pairs of arms simultaneously is given using a switch on the device.

The upper track (2,3) must be opened around the axis (13). At this point the device is placed around the stem and the track is locked by hand around it. The arms are locked around the stem by means of a command using the switch on the device. The device is now ready to climb the tree. Using the control box the operator commands the device to perform its function. When the command to climb is given, the device will perform a working sequence using its arms (4) and (7) and its cylinders (5), (6) and (8). The operator can order a climb up or down only when the means for maintenance of the tree such as harvesting, pruning or fertilizing units are at rest.

At a given interval from the moment that the operator stops the climb command, the device locks itself in order to perform its desired function. At the completion of the desired function the device is brought down, by using the down command on the control box. The track (2) (3) is then opened by hand, the arms (4) and (7) are opened using the switch on the device and the device can now be transferred to the next tree.

The climbing sequence is controlled by the programmable controller (PLC) located in the power source box. The operator has only to choose the desired destination up or down on the control box.

After the device has been placed around the stems the arms (4) and (7) lock around the stem at the specified pressure supplied by the hydraulic power unit (plus spring force).

At the "up" command:

(1) The upper pair of arms (4) open by supplied hydraulic pressure to cylinder (5).

(2) Hydraulic pressure is supplied to cylinder (6) till it extends to its end (the whole device will rise).

(3) The pair of arms (4) close around the stem.

(4) The pair of arms (7) open by supplied hydraulic pressure to cylinder (8).

(5) cylinder (6) decreases to its end.

(6) Pair of arms (7) close.

(7) The whole sequence starts over again.

The "down" command will use the same sequence in the opposite order.

When ascent stops, at the operator's command, the device locks around the stem waiting for the next order.

The work production unit is based on a circular track (3) that opens around axis (13) in order to mount the tree. On the track there is a toothed band (2). A multifunction cart (1) is attached to the track using an hydraulic engine (11) to move around, back and forth, as desired by the operator. The cart's engine (11) has a gear that fits in the toothed band, and this enables the cart to move around. The track is made on an "I" profile in order to accommodate, to support and to guide the cart's wheels. The cart is supported by four wheels—two from each side of the track. Said cart is the base for attaching the pruning unit, and the fertilizing unit (which can be used also for powdering/spraying against pests) or any other desired unit.

This attachable device must be adjusted to the size of the tree (radial adjustment). In order to do that there is an adjustable base attached to the cart. The adjustment is accomplished by hand on the ground using the four screws at the top of the cart.

The pruning function is accomplished using a blade (14) that rotates at a very high speed. The disk is connected to the hydraulic engine (11a) which is connected to the cart (1).

In order to fertilize the palm tree the male tree's powder has to be applied to the female tree. The powdering device on the cart (16) uses a small hydraulic fan in order to create a flow of air through a Venturi pipe (16a), combining air and powder flow. The air carries the powder towards it destination. The powdering unit is connected only when powdering is required. This device or similar ones can also be used for pest control.

For harvesting a round platform (9) is connected around the track in order to hold the bunch of fruit that is cut down. The platform is of two parts, and allows opening the track without disconnecting it when moving the device from one tree to another. The platform (9) allows opening due to a difference in height between the two parts of the platform which allows one part to ride above the other when the track is opened.

The hydraulic power source unit (17) is made as simple as possible in order to supply the device needs to perform its functions, while combining line pressure checks devices in order to ensure that a function has been performed as ordered, for control purposes and safety.

An hydraulic pump which supplies the oil to the system is rotated at constant velocity (close). Using an engine connected on the device (17)) the oil pressure in the system is maintained using a pressure valve. Cylinders (5) (6) and (8) are the cylinders used for climbing. They receive their oil supply through electrically controlled valves.

Cylinders (5) and (8) are the cylinders used to open and close the two pairs of arms, one cylinder for each pair. These cylinders (5) and (8) are controlled independently using two "two way valves", a pressure check device which sends an electric signal to the controller and a flow valve. When cylinders (5) and (8) are at a stationary state the pressure in their line is the systems pressure, but when one of the cylinders changes state the pressure in their line falls due to the flow valve, and a signal is sent to the controller until the pressure is built up again duo to the cylinder reaching a halt, the stem or the open end.

When a signal is sent the next step will not be performed. Cylinder (6) is the lifting cylinder controlled through a "three position valve". This cylinder's work procedure differs from the work procedure of cylinders (5) and (8); it does not work only between end zones and may be commanded for partial movement as well through while climbing at a steady pace it works between end zones. In order for the controller to know that the cylinder has reached the end zone and the next step can be performed (while climbing) a pressure checks device similar to the one used for the arms is used.

The other oil consumers are the disk's hydraulic engine (11a), the cart's engine (11) and the blower's engine (16).

The disk's and the cart's engines are directional, and the blower's engine needs only a rotation in one direction.

The fruit supporting unit is based on a ring which is brought up the tree pushed by the device. The "support unit" supports the whole tree top, branches and fruit. The ring will stay at its place till harvesting time. Then it will be taken off the tree. Said ring is composed of two half circles that open around a mutual axis. At the other end they are connected by a male female connection locked with a pin. The pin can be pulled out in order to open the ring around its axis in order to be taken off the tree. The pin is pulled out from the ground using a previously connected rope. The ring structure has three poles at 120 deg. that press against the stem (under the ring) by spring force. One end of each pole is connected to the ring while the other end trails along the stem (going up). This end has a sharp ending that penetrates the tree when downward pressure is felt. The ring can only be pushed upward or opened in order to be brought down.

Figure 2:
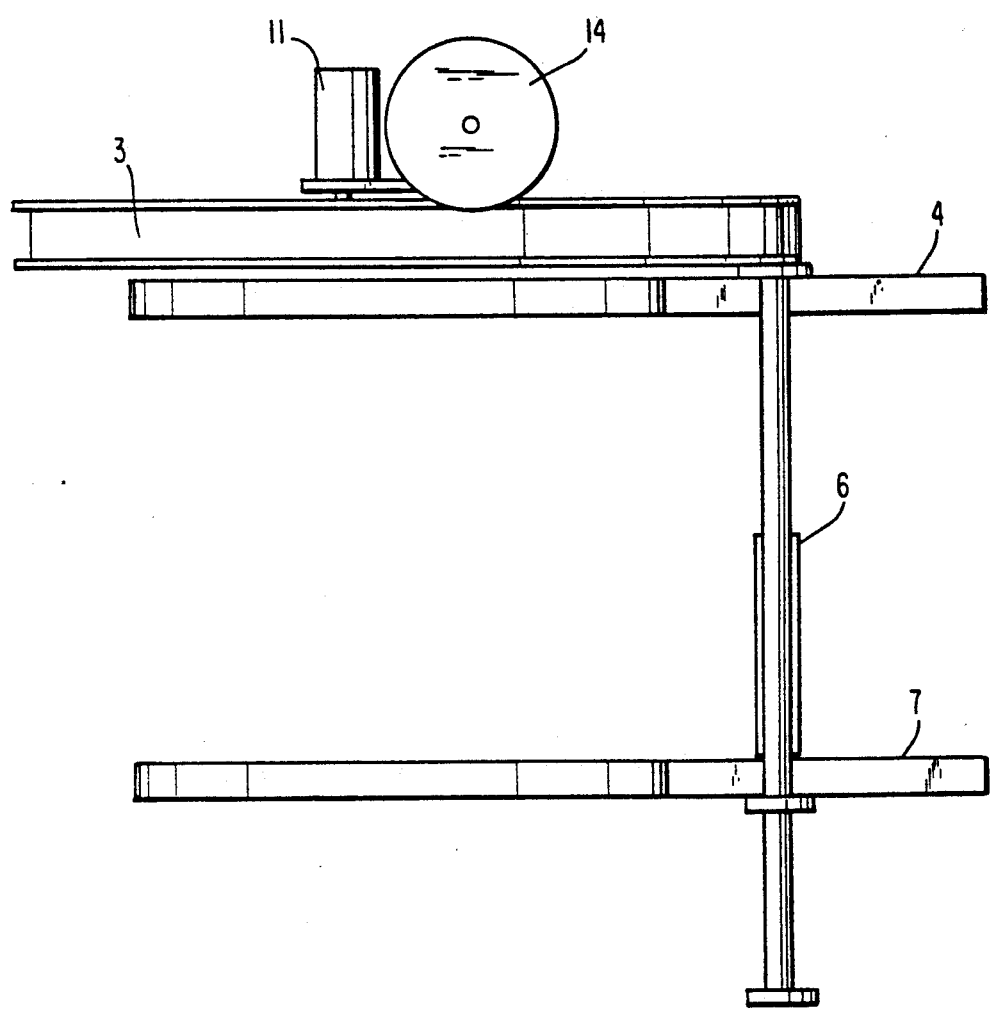
FIG. 2 represents a side view of the climbing unit and the work production unit (from the side of the arms)

FIG. 2 represents a side view of the climbing unit, and the work production unit (from the side of the arms), the two pairs of arms (4) and (7), the cylinder (6), the one in the climbing unit.

The rotating disk (14), the circular track (3) and the hydraulic engine (11) to move around the track are in the work production unit.

Figure 3:
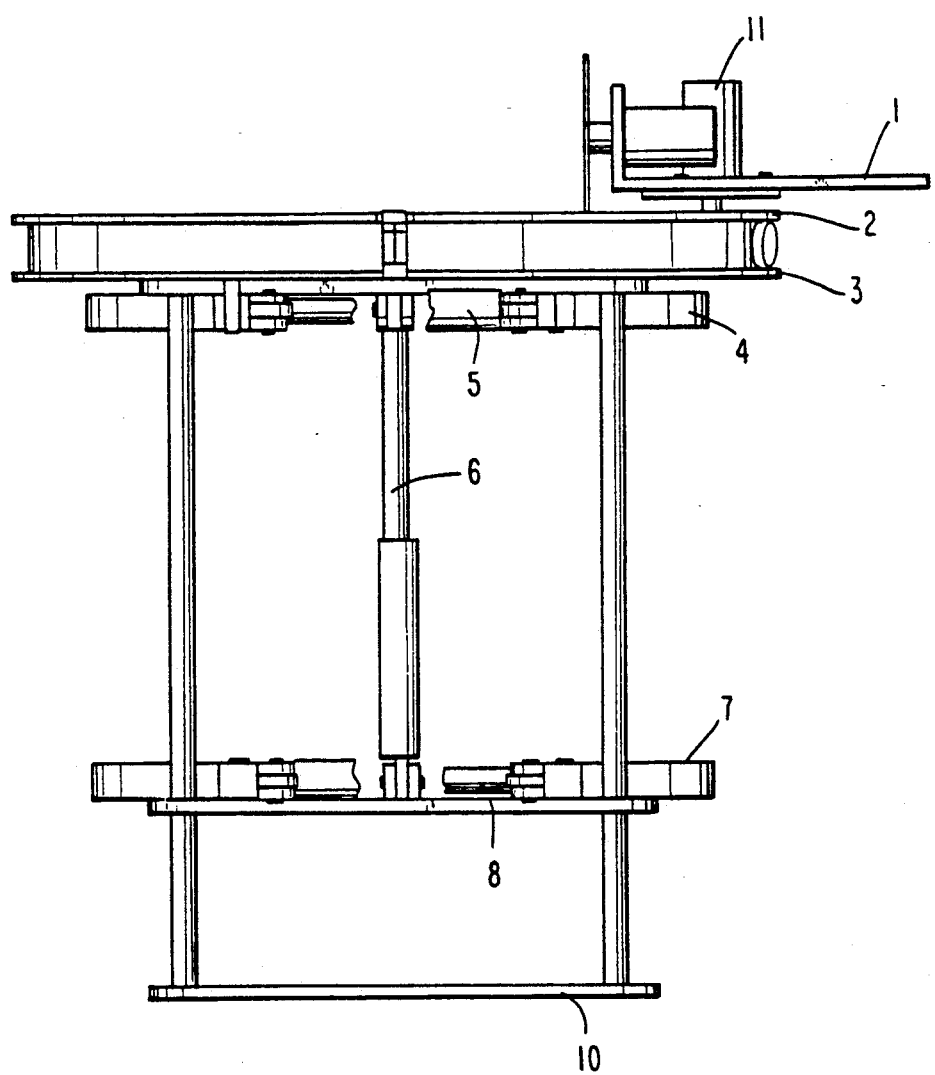
FIG. 3 represents a side view of the climbing unit and the work production unit from the rear

FIG. 3 illustrates a side view of the climbing unit and the work production unit from the rear. The climbing unit is illustrated with the pair of arms (4) and (7) opened and closed by the hydraulic pressure of cylinder (5) and (8), and cylinder (6) for varying the distance between the two pairs of arms. The work production unit is illustrated with the circular track (3) and the toothed band (2) on it, and the multi-function cart (1) attached to the track using an hydraulic engine (11) to move around.

Figure 4:
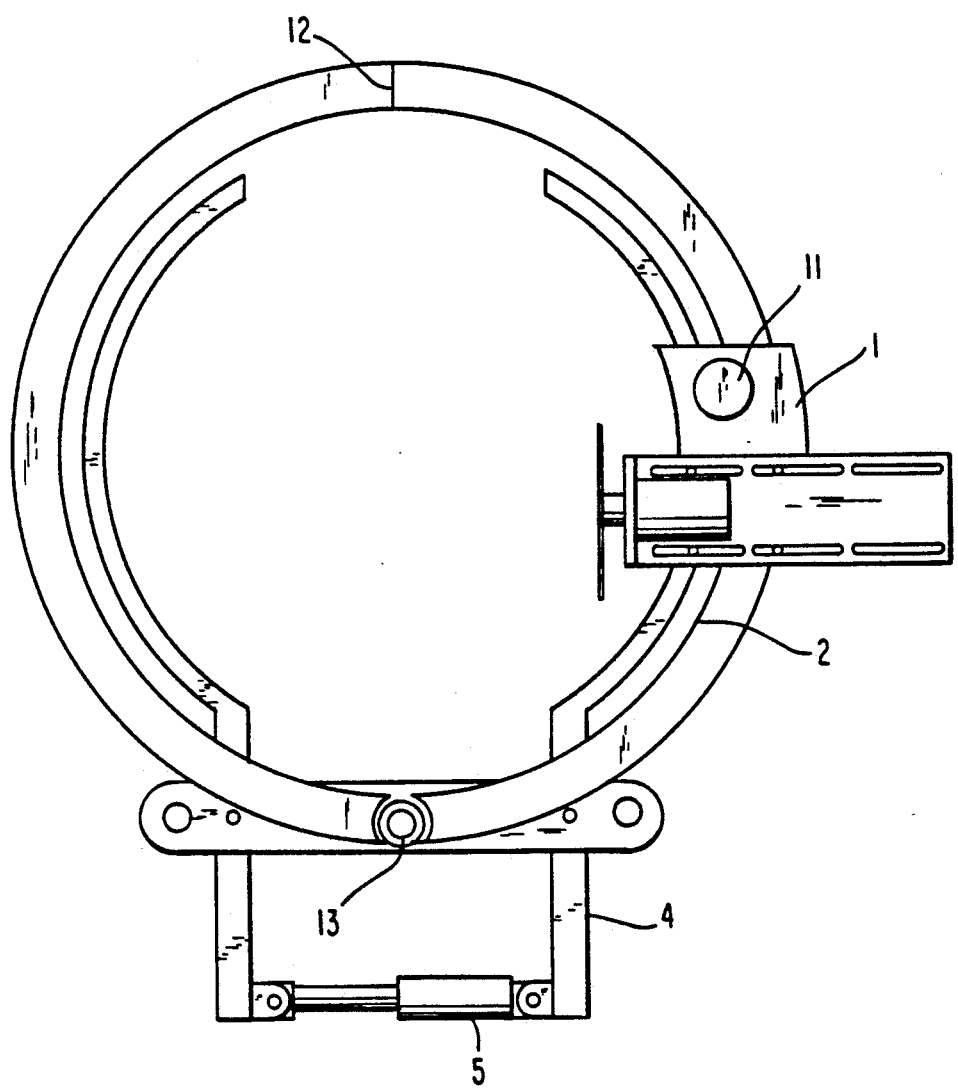
FIG. 4 represents a view from above of the work production unit and the climbing unit

FIG. 4 illustrates a view from above of the climbing unit and the work production unit.

In the climbing unit the upper pair of arms (4) is opened and closed by cylinder (5).

The work production unit is illustrated by the toothed band (2) that can be opened at point (12) around the axis (13). A multi-function cart (1) is attached to the track using an hydraulic engine (11).

Figure 5A:
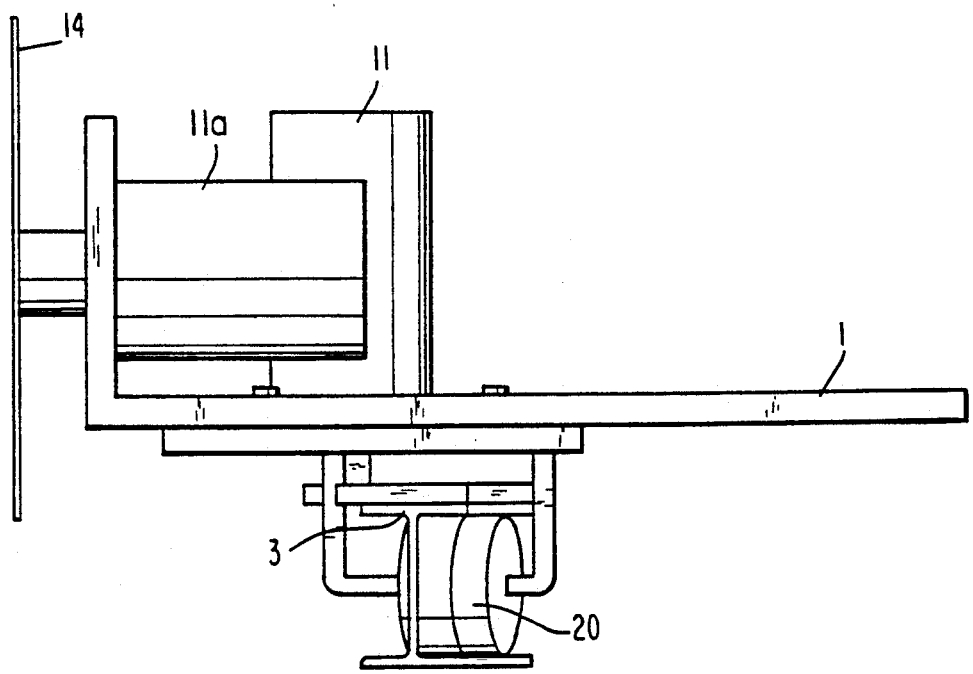
FIGS. 5a, 5b and 5c illustrate the work production unit FIG. 6 represent from various sides the flow chart of the hydraulic power unit

FIG. 5a represents a side view of the work production unit comprised of a circular track (3) made of an "I" profile a multi-functional cart (1) attached to the track using an hydraulic engine (11) to move around. The cart is supported by wheels (20). The pruning unit comprises a disk (14) connected to an hydraulic engine (11a). The other hydraulic engine (11) enables the multi-function cart (1) to move around.

Figure 5B:
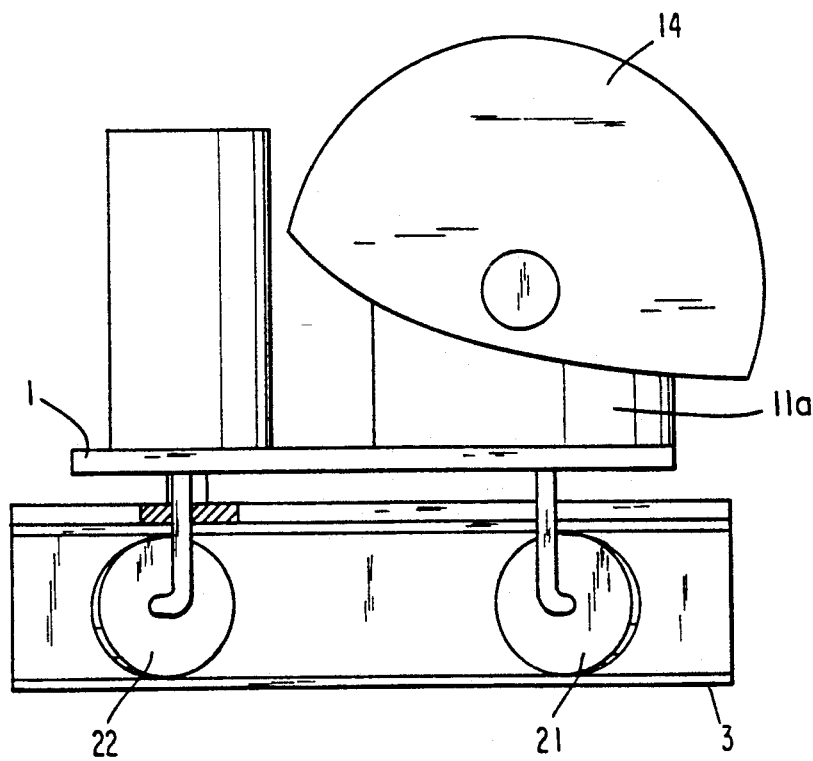

FIG. 5b illustrates another side view of the work production unit (from the center of the circular track).

The work production unit is represented by the circular track (3), a multi-function cart (1) made of an "I" profile. Said cart is supported by four wheels two (21) and (22) from each side of the track. The hydraulic engine (11) enables said cart to move around. The rotating disk (14) of the pruning unit is connected to a hydraulic engine (11a).

Figure 5C:
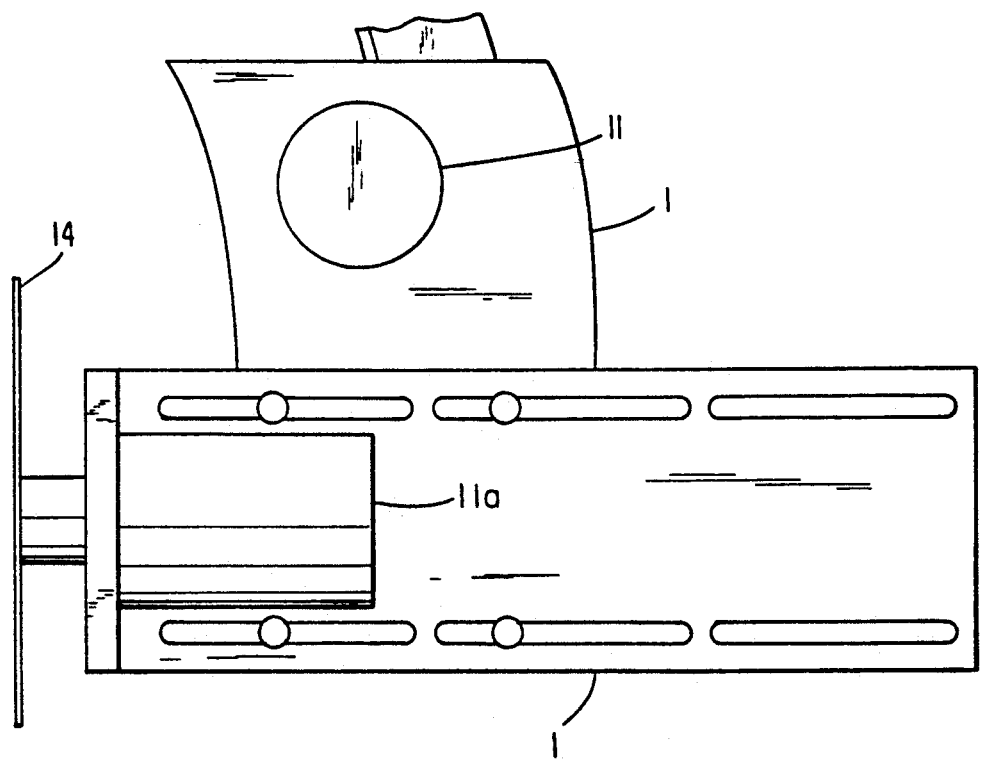

FIG. 5c illustrates a view from above of the pruning unit.

A multi-function cart (1) is attached to the track (3) using an hydraulic engine (11) to move around. The disk (14) of the pruning unit rotates at a very high speed. Said disk is connected to an hydraulic engine (11a) which is connected to the cart.

Figure 6:
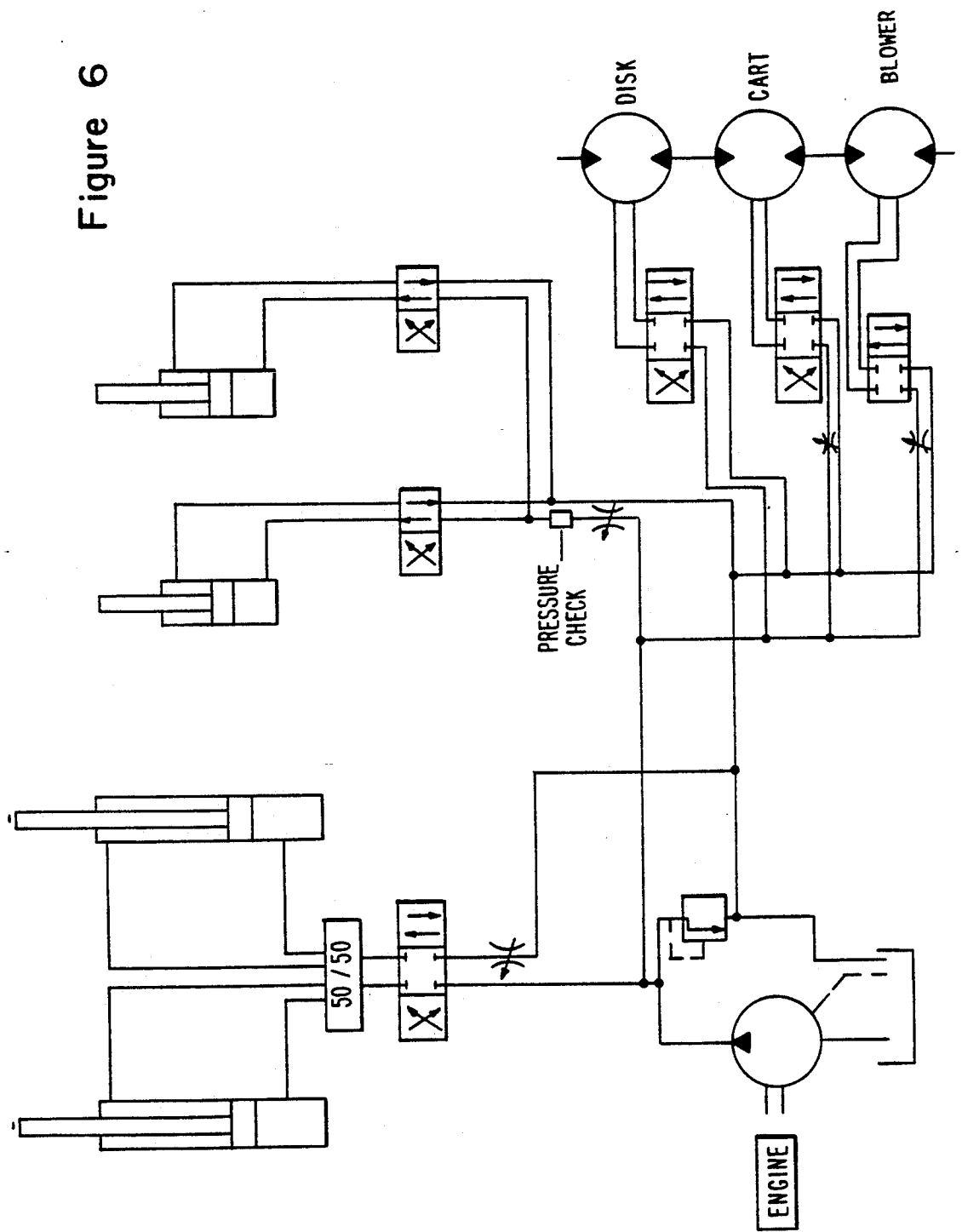

FIG. 6 represents a flow chart of the hydraulic power unit. An explanation of the hydraulic unit was provided above.

We claim:

1. A device for climbing up a tree and for maintenance thereof, said tree having at least one trunk which does not branch out and has a single stem, comprising:
    a power source;
    a climbing unit operatively connected to said power source,
    said climbing unit including at least two pairs of arms;
    mechanisms respectively associated with said pairs for selectively opening and closing said arms around the trunk; and
    a distance varying arrangement operatively interconnected to said mechanisms for varying a distance between said at least two pairs of arms;
    a work production unit operatively connected to and positioned on the climbing unit, said work production unit including a base and means, connected to said base, for performing a selected work function in the maintenance of said tree; and
    a controller, operatively connected to the climbing unit and work production unit, which translates commands, inputted through a control box operated by an operator on the ground, to the climbing unit and to the work production unit to respectively initiate operation of said mechanisms and said distance varying arrangement and said work production unit.

2. The device according to claim 1, wherein the power source is a hydraulic source.

3. The device according to claim 1, wherein the power source is located beneath the climbing unit and attached to it.

4. The device according to claim 1, wherein said mechanisms for opening and closing the arms of the climbing unit around the trunk and said distance varying arrangement for varying the distance between the two pairs of arms respectively include at least one cylinder operatively connected to the power source, wherein at least one said cylinder serves for opening and closing each pair of arms and at least another one said cylinder serve for varying the distance between the two pairs of arms.

5. The device according to claim 1, wherein the ascent or descent of the device on the trunk is controlled by the controller which initiates (i) locking of a first pair of said arms in the climbing unit around the trunk; (ii) spacing a second pair of said arms from the first pair and then (iii) consecutively locking said second pair and (iv) unlocking the first pair and spacing it from the second pair.

6. The device according to claim 1, further comprising a safety mechanism operatively connected to said climbing unit for enabling the said pairs of arms in the climbing unit to be simultaneously opened only by pressing a special button on the device itself and not by any button in the control box in the operator's hand.

7. The device according to claim 6, wherein for safety purposes, the pairs of arms are closed simultaneously around the stem by a spring force exerted by springs operatively mounted to the climbing unit in the case of failure of said power source.

8. The device according to claim 1, wherein the base of the work production unit includes a circular track that opens around an axis and which has a toothed band on it.

9. The device according to claim 8, wherein the circular track has an "I" profile.

10. The device according to claim 9, wherein the means for maintenance of the trees located in the work production unit includes;
    a multi-functional cart attached to the track, including an engine to move the cart along the track around the trunk as desired by the operator, and wherein said cart engine has a gear that fits in the toothed band and wherein the cart is supported by wheels, mounted on each side of the track; and at least one of
    a harvesting unit, a pruning unit, a fertilizing unit, and fruit supporting unit for performing said selected work function, wherein said unit is located on the multi-functional cart.

11. The device according to claim 10, wherein the pruning unit is comprised of a rotating disk connected to another engine.

12. The device according to claim 10, wherein the fertilizing unit is comprised of a powdering element with a hydraulic fan creating a flow of air through a Venturi pipe, combining air and powder flow.

13. The device according to claim 10, wherein the fruit supporting unit is comprised of a ring which supports the entire tree top, including branches and fruit.

14. The device according to claim 10, wherein the harvesting unit is comprised of a round platform holding a bunch of fruit that is cut down.

15. A device for climbing up a tree and for maintenance thereof, comprising:
    a power source;
    a climbing unit operatively connected to said power source, said climbing unit including at least a pair of climbing mechanisms each operable to open and close into and out of engagement with a tree trunk, and an extensible/retractable unit for varying the distance between said climbing mechanisms;
    a control unit operable to vary the distance between said climbing mechanisms by extension or retraction of said extensible/retractable unit when one of said climbing mechanisms is locked to the trunk and the other of said climbing mechanisms is open so as to be moved along the trunk before being locked to it.

16. The device of claim 15, further comprising:
    a work production unit operatively connected to and positioned on the climbing unit, said work production unit including means for performing a selected work function in the maintenance of said tree.

17. A method for caring and maintenance of trees such as palm or coconut trees having at least one trunk which does not branch out and has a single stem, comprising the steps of:
    mounting a climbing unit to the tree trunk, said climbing unit including at least two pairs of arms and mechanisms respectfully associated with said arms for selectively opening and closing said arms around the trunk and a distance varying arrangement operatively interconnected to the mechanisms for varying a distance between said mechanisms;
    closing the arms of one mechanism to lock the unit against the trunk while opening the arms of the other mechanism;
    varying the distance between said two mechanisms by extension/retraction of said distance varying arrangement;
    locking the arms of the opened mechanism against the tree trunk; and
    unlocking the arms of the other said mechanism; and repeating the foregoing steps to progressively advance the climbing unit along the tree trunk.

* * * * *